(12) United States Patent
Katsuyama et al.

(10) Patent No.: US 8,988,594 B2
(45) Date of Patent: Mar. 24, 2015

(54) LENS BARREL, IMAGING PICKUP DEVICE, AND CAMERA

(75) Inventors: Norikazu Katsuyama, Osaka (JP); Yusuke Adachi, Osaka (JP); Fumio Muramatsu, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 83 days.

(21) Appl. No.: 13/696,992

(22) PCT Filed: Jul. 28, 2011

(86) PCT No.: PCT/JP2011/004293
§ 371 (c)(1),
(2), (4) Date: Nov. 8, 2012

(87) PCT Pub. No.: WO2012/081142
PCT Pub. Date: Jun. 21, 2012

(65) Prior Publication Data
US 2013/0070124 A1   Mar. 21, 2013

(30) Foreign Application Priority Data
Dec. 13, 2010  (JP) .................................. 2010-276541

(51) Int. Cl.
*G02B 15/14* (2006.01)
*H04N 5/262* (2006.01)
(Continued)

(52) U.S. Cl.
CPC ....................................... *G02B 7/102* (2013.01)
USPC ......... 348/351; 348/240.3; 348/357; 359/696

(58) Field of Classification Search
CPC ... H04N 5/23212; H04N 5/2254; G02B 7/28; G02B 7/282; G03B 3/00; G03B 3/02
USPC ...................... 348/240.3, 335, 345, 351, 357; 359/696–697
See application file for complete search history.

(56) References Cited

U.S. PATENT DOCUMENTS

| 5,212,598 A | 5/1993 | Kikuchi |
| 5,455,649 A | 10/1995 | Yamada et al. |

(Continued)

FOREIGN PATENT DOCUMENTS

| JP | H4-040405 A | 2/1992 |
| JP | H4-172410 A | 6/1992 |

(Continued)

OTHER PUBLICATIONS

International Search Report of PCT Application No. PCT/JP2011/004293.

(Continued)

*Primary Examiner* — Daniel M Pasiewicz
(74) *Attorney, Agent, or Firm* — Shinjyu Global IP (57) ABSTRACT

A lens barrel comprises a first zoom/focus lens group and a second zoom/focus lens group configured to respectively vary a focal distance and imaging distance by moving in an optical axis, a first actuator configured to drive the first zoom/focus lens group, a second actuator configured to drive the second zoom/focus lens group, and a drive controller configured to independently control the first actuator and the second actuator. The drive controller is configured to wobble the first zoom/focus lens group by reciprocating only the first zoom/focus lens group out of the first and second zoom/focus lens groups in a optical axis direction.

5 Claims, 6 Drawing Sheets

(51) Int. Cl.
*G03B 13/00* (2006.01)
*H04N 5/232* (2006.01)
*G02B 7/10* (2006.01)

(56) References Cited

U.S. PATENT DOCUMENTS

| | | | |
|---|---|---|---|
| 5,708,870 | A | 1/1998 | Sugita et al. |
| 6,993,256 | B2 | 1/2006 | Ogg et al. |
| 7,006,139 | B2 * | 2/2006 | Ohkawara ............... 348/347 |
| 7,095,566 | B2 * | 8/2006 | Suzuki et al. ............ 359/696 |
| 7,574,126 | B2 | 8/2009 | Honjo et al. |
| 7,782,548 | B2 | 8/2010 | Yumiki et al. |
| 2003/0030742 | A1 * | 2/2003 | Ike ........................ 348/354 |
| 2009/0251779 | A1 * | 10/2009 | Adachi et al. ............ 359/557 |
| 2009/0251780 | A1 * | 10/2009 | Adachi et al. ............ 359/557 |
| 2009/0273703 | A1 * | 11/2009 | Kawauchi ............... 348/347 |
| 2011/0122516 | A1 | 5/2011 | Jang |
| 2012/0082444 | A1 | 4/2012 | Yumiki et al. |
| 2013/0050568 | A1 * | 2/2013 | Adachi et al. ............ 348/345 |

FOREIGN PATENT DOCUMENTS

| | | |
|---|---|---|
| JP | H5-107451 A | 4/1993 |
| JP | H8-043718 A | 2/1996 |
| JP | H8-136793 A | 5/1996 |
| JP | 2000-275504 A | 10/2000 |
| JP | 2010-079250 A | 4/2010 |

OTHER PUBLICATIONS

International Search Report of co-pending PCT Application No. PCT/JP2011/004292.
The Office Action for co-pending U.S. Appl. No. 13/696,990, issued Apr. 29, 2014.
The Office Action for co-pending U.S. Appl. No. 13/696,990, issued Nov. 24, 2014.

\* cited by examiner

LENS BARREL, IMAGING PICKUP DEVICE, AND CAMERA

TECHNICAL FIELD

The technology disclosed herein relates to a camera capable of capturing still and moving pictures, and to an imaging pickup device and a lens barrel used in this camera.

BACKGROUND ART

In general, an imaging pickup device that can capture both still and moving pictures performs focusing and zooming by means of a focus actuator that drives a single focus lens group and a zoom actuator that drives a single zoom lens group. The focus actuator and the zoom actuator consist of a DC motor, a stepping motor, an ultrasonic motor, or the like. Focal position detection during moving picture capture is accomplished by performing what is known as wobbling, in which the focus lens group is moved back and forth over a tiny range in the optical axis direction. During zooming, the focus lens group performs wobbling around a zoom tracking curve to match the movement of the zoom lens group, and zoom tracking and focal position detection are carried out simultaneously.

SUMMARY

Technical Problem

With Japanese Laid-Open Patent Application H4-172410, however, since the roles performed by the lens groups are separated into the zoom lens group that serves to vary the focal distance, and the focus lens group that serves to vary the imaging distance, a problem is that the lens barrel ends up being larger. In view of this, the lens barrel can be made more compact by installing an actuator for each of three or more lens groups and zooming and focusing the lens groups individually. In this case, there will be more noise (operating noise), which may end up being recorded during moving picture imaging, and the power consumption is also higher, so the imaging time will be shorter.

It is an object of the present invention to provide a lens barrel, an imaging pickup device, and a camera with which the operation of the lens groups in auto-focusing during moving picture imaging is kept to a minimum, noise is curtailed, power consumption is reduced, and accurate auto-focusing can be carried out.

Solution to Problem

A lens barrel pertaining to the present invention comprises a first zoom/focus lens group and a second zoom/focus lens group configured to respectively vary a focal distance and imaging distance by moving in an optical axis, a first actuator configured to drive the first zoom/focus lens group, a second actuator configured to drive the second zoom/focus lens group, and a drive controller configured to independently control the first actuator and the second actuator. The drive controller is configured to wobble the first zoom/focus lens group by reciprocating only the first zoom/focus lens group out of the first and second zoom/focus lens groups in a optical axis direction.

Advantageous Effects

With the present invention, the operation of the lens groups in auto-focusing during moving picture imaging is kept to a minimum, so noise is curtailed, power consumption is reduced, and accurate auto-focusing can be carried out.

DESCRIPTION OF EMBODIMENTS

The lens barrel, imaging pickup device, and camera pertaining to embodiments of the present invention will be described. The following embodiments are merely examples of the present invention, and the present invention is not limited to or by these embodiments. It will be apparent to those skilled in the art from this disclosure that the following descriptions of the embodiments are provided for illustration only and not for the purpose of limiting the invention as defined by the appended claims and their equivalents.

Embodiments

A digital camera 1 (an example of an imaging pickup device) pertaining to an embodiment will be described through reference to FIGS. 1 to 5.

1: Configuration of Digital Camera

Figure 1:
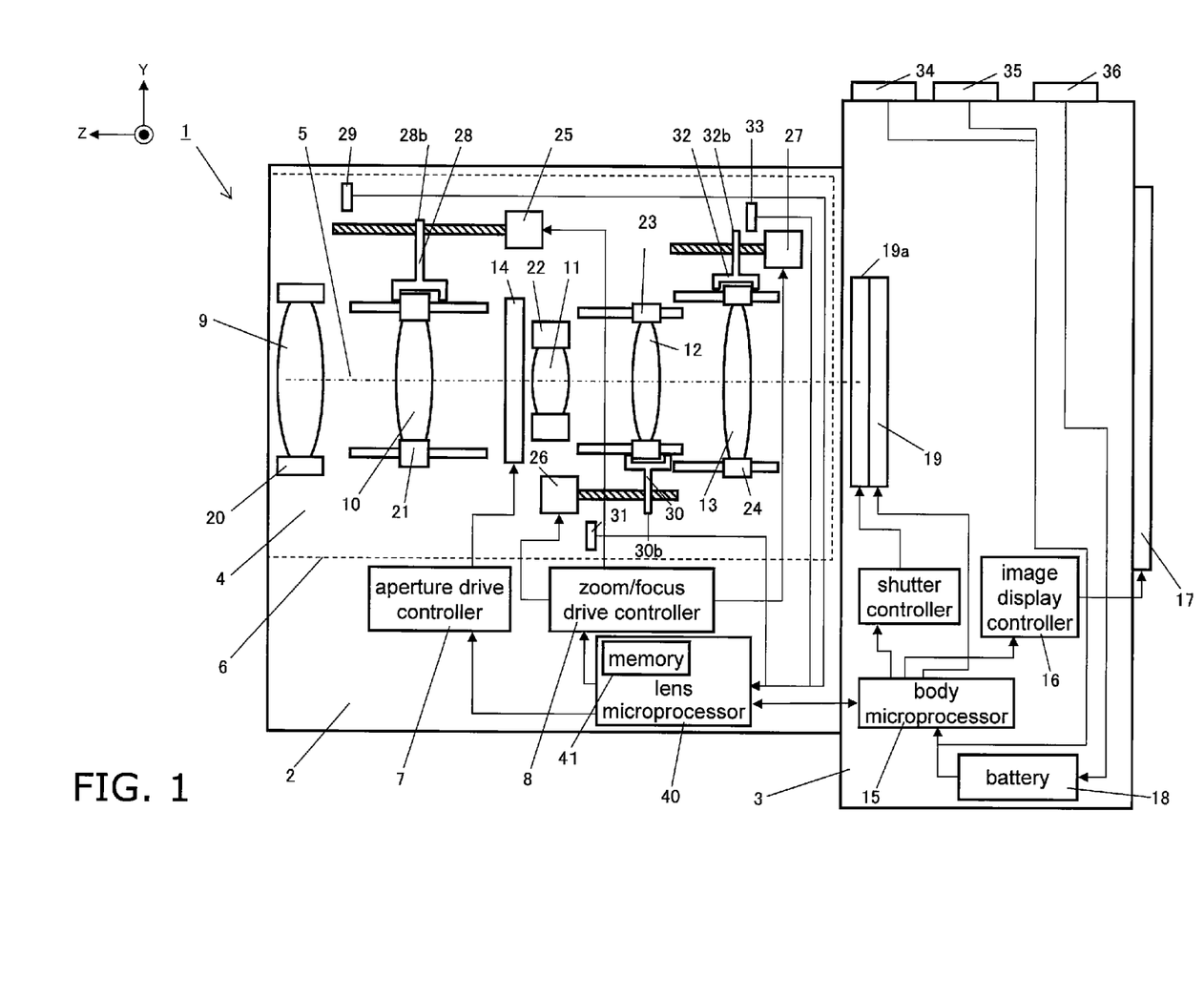
FIG. 1 is a simplified cross section of a digital camera.
Figure 2:
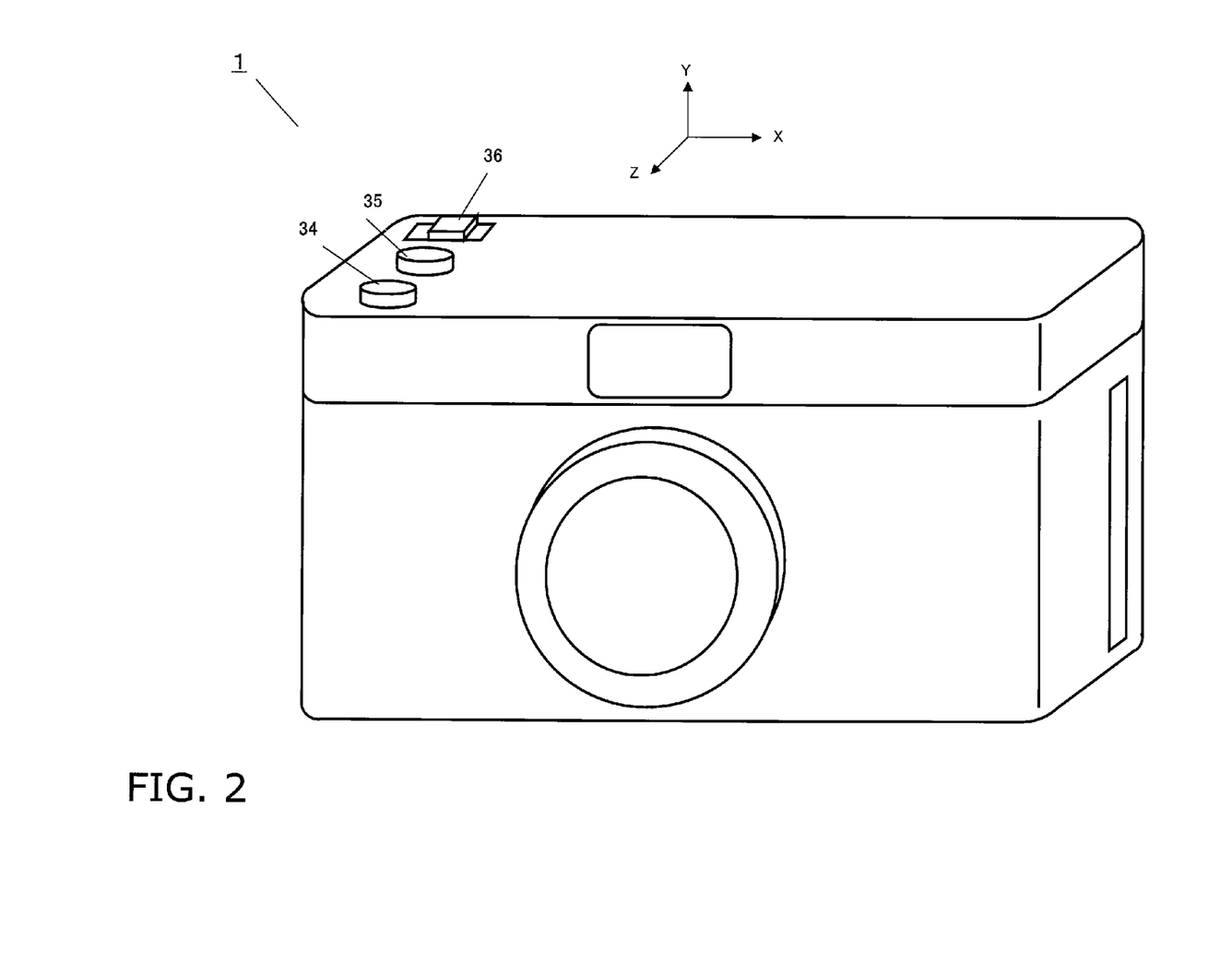
FIG. 2 is an oblique view of a digital camera.

FIG. 1 is a simplified cross section of the digital camera 1. FIG. 2 is a simplified oblique view of the digital camera 1. As shown in FIG. 1, the digital camera 1 comprises a lens barrel 2 and a camera body 3.

As shown in FIGS. 1 and 2, in this embodiment, a three-dimensional perpendicular coordinate system is set up for the digital camera 1. The optical axis 5 of an optical system 4 (discussed below) coincides with the Z axis direction. The X axis direction coincides with the horizontal direction in the landscape orientation of the digital camera 1. The Y axis direction coincides with the vertical direction in the landscape orientation of the digital camera 1. These directions are not intended to limit the usage state of the digital camera 1.

As shown in FIG. 1, the lens barrel 2 has a lens support mechanism 6, an aperture drive controller 7, a zoom/focus drive controller 8, and a lens microprocessor 40.

The lens support mechanism 6 has the optical system 4, lens support frames 20 to 24, zoom/focus motors 25 to 27, and lens group photosensors 29, 31, and 33.

The camera body 3 has a body microprocessor 15, an image display controller 16, an image display component 17, a battery 18, and an imaging sensor 19.

The lens microprocessor 40 is connected with the body microprocessor 15 via an interface, and communicates with the body microprocessor 15.

(1) Optical System

The optical system 4 has a first lens group 9, a second lens group 10, a third lens group 11, a fourth lens group 12, a fifth lens group 13, and an aperture mechanism 14. Of these lens groups, the second lens group 10, the fourth lens group 12, and the fifth lens group 13 are each an example of a zoom/focus lens group that adjusts the focal state of a subject image and varies the zoom ratio through movement along the optical axis. More specifically, one lens group selected from among the second lens group 10, the fourth lens group 12, and the fifth lens group 13 is an example of a "first zoom/focus lens group," and one of the remaining two lens groups is an example of a "second zoom/focus lens group."

The second lens group 10, the fourth lens group 12, and the fifth lens group 13, which are zoom/focus lens groups, each vary the focal distance and imaging distance (object imaging distance) by moving in the Z axis direction along the optical axis 5.

(2) Lens Support Mechanism

The lens support mechanism 6 is used to support the aperture mechanism 14 and the various lens groups 9 to 13 of the optical system 4, either movably or fixed. The lens support mechanism 6 has a fixing frame (not shown), a first lens group support frame 20, a second lens group support frame 21, a third lens group support frame 22, a fourth lens group support frame 23, and a fifth lens group support frame 24.

The fixing frame (not shown) supports the first lens group support frame 20, the aperture mechanism 14, the second lens group zoom/focus motor 25, the third lens group support frame 22, the fourth lens group zoom/focus motor 26, and the fifth lens group zoom/focus motor 27, and also supports six guide poles extending in the Z axis direction. The second lens group zoom/focus motor 25, the fourth lens group zoom/focus motor 26, and the fifth lens group zoom/focus motor 27 are stepping motors, for example.

In this embodiment, one zoom/focus motor selected from among the second lens group zoom/focus motor 25, the fourth lens group zoom/focus motor 26, and the fifth lens group zoom/focus motor 27 is an example of a "first zoom/focus motor," and one of the remaining two zoom/focus motors is an example of a "second zoom/focus motor."

The first lens group support frame 20 supports the first lens group 9.

The second lens group support frame 21 supports the second lens group 10, and has a second lens group rack 28 and a second lens group rack protrusion 28b. The second lens group support frame 21 is supported movably in the Z axis direction in a state in which the guide poles are inserted into the second lens group support frame 21 so that rotation is impossible. The second lens group rack protrusion 28b is a portion used to detect the home point of the second lens group 10, and is provided at a position that can pass through the detection region of the second lens group photosensor 29.

The second lens group zoom/focus motor 25 is fixed to the fixing frame (not shown), and drives the second lens group support frame 21 in the Z axis direction. A lead screw of the second lens group zoom/focus motor 25 rotates based on a drive signal inputted from the zoom/focus drive controller 8. The rotational motion generated by the second lens group zoom/focus motor 25 is converted by the lead screw and the second lens group rack 28 into rectilinear motion of the second lens group support frame 21 in the Z axis direction. This allows the second lens group support frame 21 to move in the Z axis direction.

The third lens group support frame 22 supports the third lens group 11.

The fourth lens group support frame 23 supports the fourth lens group 12, and has a fourth lens group rack 30 and a fourth lens group rack protrusion 30b. The fourth lens group support frame 23 is supported movably in the Z axis direction in a state in which guide poles are inserted into the fourth lens group support frame 23 so that rotation is impossible. The fourth lens group rack protrusion 30b is a portion used to detect the home point of the fourth lens group 12, and is provided at a position that can pass through the detection region of the fourth lens group photosensor 31.

The fourth lens group zoom/focus motor 26 is fixed to the fixing frame (not shown), and drives the fourth lens group support frame 23 in the Z axis direction. A lead screw of the fourth lens group zoom/focus motor 26 rotates based on a drive signal inputted from the zoom/focus drive controller 8. The rotational motion generated by the fourth lens group zoom/focus motor 26 is converted by the lead screw and the fourth lens group rack 30 into rectilinear motion of the fourth lens group support frame 23 in the Z axis direction. This allows the fourth lens group support frame 23 to move in the Z axis direction.

The fifth lens group support frame 24 supports the fifth lens group 13, and has a fifth lens group rack 32 and a fifth lens group rack protrusion 32b. The fifth lens group support frame 24 is supported movably in the Z axis direction in a state in which guide poles are inserted into the fifth lens group support frame 24 so that rotation is impossible. The fifth lens group rack protrusion 32b is a portion used to detect the home point of the fifth lens group 13, and is provided at a position that can pass through the detection region of the fifth lens group photosensor 33.

The fifth lens group zoom/focus motor 27 is fixed to the fixing frame (not shown), and drives the fifth lens group support frame 24 in the Z axis direction. A lead screw of the fifth lens group zoom/focus motor 27 rotates based on a drive signal inputted from the zoom/focus drive controller 8. The rotational motion generated by the fifth lens group zoom/focus motor 27 is converted by the lead screw and the fifth lens group rack 32 into rectilinear motion of the fifth lens group support frame 24 in the Z axis direction. This allows the fifth lens group support frame 24 to move in the Z axis direction.

(3) Zoom/Focus Drive Controller

The zoom/focus drive controller 8 is able to control all three of the zoom/focus motors 25, 26, and 27 simultaneously, at the same or different drive speeds. Furthermore, the zoom/focus drive controller 8 is able to drive just one or two of the three zoom/focus motors 25, 26, and 27. When the zoom/focus lens groups 10, 12, and 13 are driven to their focal positions, for example, high-speed auto-focusing can be accomplished by simultaneously driving the three zoom/focus motors 25, 26, and 27.

Also, the zoom/focus drive controller 8 drives just one of the zoom/focus lens groups 10, 12, 13, such as the fifth lens group 13, which is the lightest of the zoom/focus lens groups, during what is known as wobbling, in which the imaging distance is moved back and forth within a tiny range in order to confirm the focal position in moving picture capture, etc. Consequently, the imaging ratio change, drive noise, and power consumption can all be reduced. More specifically, the zoom/focus drive controller 8 controls the fifth lens group zoom/focus motor 27 so that just the fifth lens group 13 is driven back and forth in the direction of the optical axis 5 during wobbling.

The lens microprocessor 40 is a control device serving as the functional center of the lens barrel 2. The lens microprocessor 40 is connected to the various components installed in the lens barrel 2, and controls the various sequences of the lens barrel 2. A CPU, a memory 41, etc., are installed in the lens microprocessor 40, and the CPU reads the programs stored in the memory 41, which allows the lens microprocessor 40 to carry out its various functions.

The zoom/focus drive controller 8 is controlled by the lens microprocessor 40. Information (lens information) related to the lens barrel 2, position information about the zoom/focus lens groups corresponding to subject distance, and so forth are stored in the memory 41 installed in the lens microprocessor 40.

The memory 41 is a nonvolatile memory, for example, and can hold recorded information even when the power supply has been shut off.

The lens microprocessor 40 instructs the zoom/focus drive controller 8 to control the zoom/focus motors 25, 26, and 27 based on position information about the zoom/focus lens groups corresponding to the subject distance. Consequently, the various zoom/focus lens groups are driven in the Z axis direction. The lens microprocessor 40 is able to ascertain the positions of the zoom/focus lens groups 10, 12, and 13 in the direction of the optical axis 5. That is, the lens microprocessor 40 is able to ascertain the subject distance. The subject distance is the distance to a subject for which an optical image has been focused by the optical system 4. More specifically, the lens microprocessor 40 confirms that the second lens group support frame 21 is at its home position from the detection signal of the second lens group photosensor 29, after which the position of the second lens group 10 in the direction of the optical axis 5 is ascertained by measuring the drive amount (such as the number of steps) of the second lens group zoom/focus motor 25. Also, the lens microprocessor 40 confirms that the fourth lens group support frame 23 is in its home position from the detection signal of the fourth lens group photosensor 31, after which the position of the fourth lens group 12 in the direction of the optical axis 5 is ascertained by measuring the drive amount (such as the number of steps) of the fourth lens group zoom/focus motor 26. Also, the lens microprocessor 40 confirms that the fifth lens group support frame 24 is in its home position from the detection signal of the fifth lens group photosensor 33, after which the position of the fifth lens group 13 in the direction of the optical axis 5 is ascertained by measuring the drive amount (such as the number of steps) of the fifth lens group zoom/focus motor 27.

Also, the lens microprocessor 40 is able to receive signals from a power switch 35, a shutter button 34, and a zoom lever 36.

(4) Aperture Mechanism

The aperture mechanism 14 is controlled by the aperture drive controller 7. The opening shape of the aperture mechanism 14 is changed by driving aperture vanes (not shown) in the opening and closing directions. The aperture value of the optical system 4 can be varied by driving the aperture vanes. The aperture drive controller 7 varies the aperture diameter according to the imaging distance.

(5) Camera Body

The display component 17 is provided to the rear face of the camera body 3, and the shutter button 34, the power switch 35, and the zoom lever 36 are provided to the upper face of the camera body 3.

The power switch 35 is used to switch the power on and off to the digital camera 1. When the power is switched on with the power switch 35, power is supplied to the various components of the camera body 3 and the lens barrel 2.

A mode dial (not shown) is used to switch between still picture imaging mode, moving picture imaging mode, reproduction mode, and other such operating modes. The user turns the mode dial to switch the operating mode. When the mode dial is used to select still picture imaging mode, the operating mode is switched to still picture imaging mode, and when the mode dial is used to select moving picture imaging mode, the operating mode is switched to moving picture imaging mode. In moving picture imaging mode, basically, moving picture imaging is possible. Further, when the mode dial is used to select reproduction mode, the operating mode is switched to reproduction mode, and the captured image is displayed on the display component 17.

The shutter button 34 is operated by the user in capturing an image. When the shutter button 34 is pressed, a timing signal is outputted to the body microprocessor 15. The shutter button 34 is a two-position switch that can be pressed halfway or all the way down. When the user presses the shutter button 34 halfway down, processing for light metering and ranging begins. When the user presses the shutter button 34 all the way down in a state in which the shutter button 34 had been pressed halfway down, a timing signal is outputted, and image data is acquired by the imaging element 19.

The zoom lever 36 is operated by the user in capturing an image. When the zoom lever 36 is operated, the amount of its operation is outputted to the body microprocessor 15. The body microprocessor 15 outputs a command to the zoom/focus drive controller 8 according to this operation amount, and controls the lens groups 10, 12, and 13 so that they move to the desired zoom positions.

(6) Imaging Sensor

The imaging sensor 19 is, for example, a CCD (charge coupled device) sensor that converts an optical image formed by the optical system 4 into an electrical signal. Drive of the imaging sensor 19 is controlled by a timing signal. The imaging sensor 19 may also be a CMOS (complementary metal-oxide semiconductor) sensor.

A shutter controller (not shown) actuates a shutter unit 19a (not shown) according to the control signal outputted from the body microprocessor 15 upon receipt of a timing signal.

In this embodiment, contrast detection, which makes use of image data produced by the imaging sensor 19, is employed as the auto-focusing method. Using contrast detection affords very precise focal adjustment.

(7) Body Microprocessor

The body microprocessor 15 is a control device serving as the functional center of the camera body 3, and controls the various components of the digital camera 1 according to inputted information. More specifically, a CPU, ROM, and RAM are installed in the body microprocessor 15, and the CPU reads the programs stored in the ROM, which allows the body microprocessor 15 to carry out its various functions. For example, the body microprocessor 15 can confirm that the second lens group support frame 21 is in its home position from the detection signal of the second lens group photosensor 29.

(8) Image Display Component

The image display component consists of the display component 17 and the image display controller 16. The display component 17 is a liquid crystal monitor, for example. The display component 17 displays a captured image based on a command from the image display controller 16. Possible display modes with the display component 17 include a display mode in which just an image signal is displayed as a visible image, and a display mode in which an image signal and information about the date and time of capture are displayed as visible images.

(9) Battery

The battery 18 supplies power to the various components of the camera body 3, and supplies power to the lens barrel 2. In this embodiment, the battery 18 is a rechargeable battery. The battery 18 may be a dry cell, or may be an external power supply with which power is supplied from the outside with a power cord.

2: Operation of Digital Camera

The operation of the digital camera 1 will now be described.

(1) Still Picture Imaging

When the user presses the shutter button 34 all the way down, the aperture drive controller 7 is controlled by the lens microprocessor 40 so that the aperture value of the optical system 4 is set to an aperture value calculated based on the light metering output of the imaging sensor 19. Consequently, the aperture mechanism 14 is stopped down to the indicated aperture value. Simultaneously with the aperture value indication, the body microprocessor 15 sends a command to drive the imaging sensor 19 and a command to drive the shutter unit 19a. As a result, imaging sensor 19 is exposed by the shutter unit 19a for the length of time of the shutter speed calculated based on the light metering output from the imaging sensor 19.

After image capture processing has been executed, when imaging is finished, the body microprocessor 15 records an image signal to an internal memory and/or a removable memory. The body microprocessor 15 also records imaging mode information (whether auto-focus imaging mode or manual focus imaging mode) along with an image signal to an internal memory and/or a removable memory.

Upon completion of the exposure, the body microprocessor 15 reads the image data from the imaging sensor 19, and image data is outputted to the image display controller 16. Consequently, a captured image is displayed on the display component 17.

Also, upon completion of exposure, the shutter unit 19a is reset to its initial position by the body microprocessor 15. Also, a command is issued from the lens microprocessor 40 to the aperture drive controller 7 to reset the aperture mechanism 14 to its open position, and reset commands are issued by the lens microprocessor 40 to the various units. Upon completion of the resetting, the lens body microprocessor 15 confirms that the shutter button 34 has not been pressed and ends the imaging sequence after the receipt of reset completion information and after the completion of the series of processing following exposure.

(2) Moving Picture Imaging

The digital camera 1 also has the function of capturing moving pictures. In moving picture imaging mode, image data is produced by the imaging sensor 19 at a specific period, and the image data thus produced is utilized to continuously carry out auto-focusing by contrast detection method. In moving picture imaging mode, a moving picture is recorded when the shutter button 34 is pressed, and recording of the moving picture stops when the shutter button 34 is pressed again.

3: Lens Position by Zoom Position and Focus Position

Figure 3:
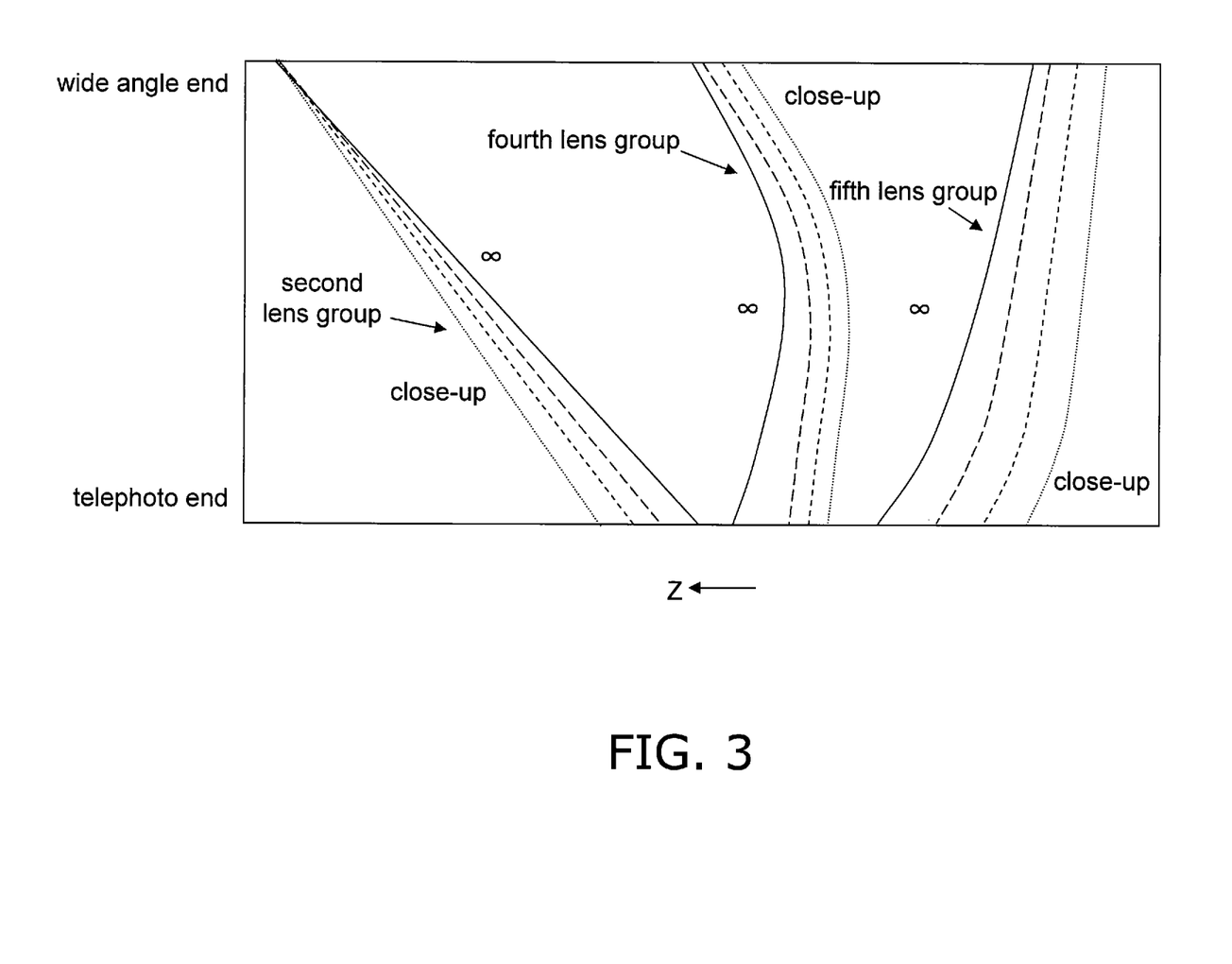
FIG. 3 is a diagram of the positions of the lens groups in zooming and focusing operation in an embodiment of the present invention.

FIG. 3 is a diagram showing the positions of the second lens group 10, the fourth lens group 12, and the fifth lens group 13 in zooming and focusing. The horizontal axis is the lens position, the left side is the subject direction, and the right side is the direction of the imaging element 19. The vertical axis is the zoom position, the upper side is the wide angle side, and the lower side is the telephoto side. Therefore, when the second lens group 10, for example, zooms from the wide angle end to the telephoto end, the lens position moves from the subject side to the imaging element side. The focus position is indicated by a curve or straight line drawn from ∞ to close-up, and the second lens group 10, for example, moves from the imaging element side to the subject side when the focus position is changed from infinity to close-up at the telephoto end.

4: Operation of Zoom/Focus Lens Groups During Moving Picture Imaging

With the lens barrel of the present invention, the zoom/focus drive controller 8 controls the three zoom/focus motors 25, 26, and 27 individually, and changes the focal distance and the imaging distance by varying the positions of the three zoom/focus lens groups 10, 12, and 13. Accordingly, there is no allocation of roles into a zoom lens group for varying the focal distance and a focus lens group for varying the imaging distance as with a conventional lens barrel.

Figure 4:
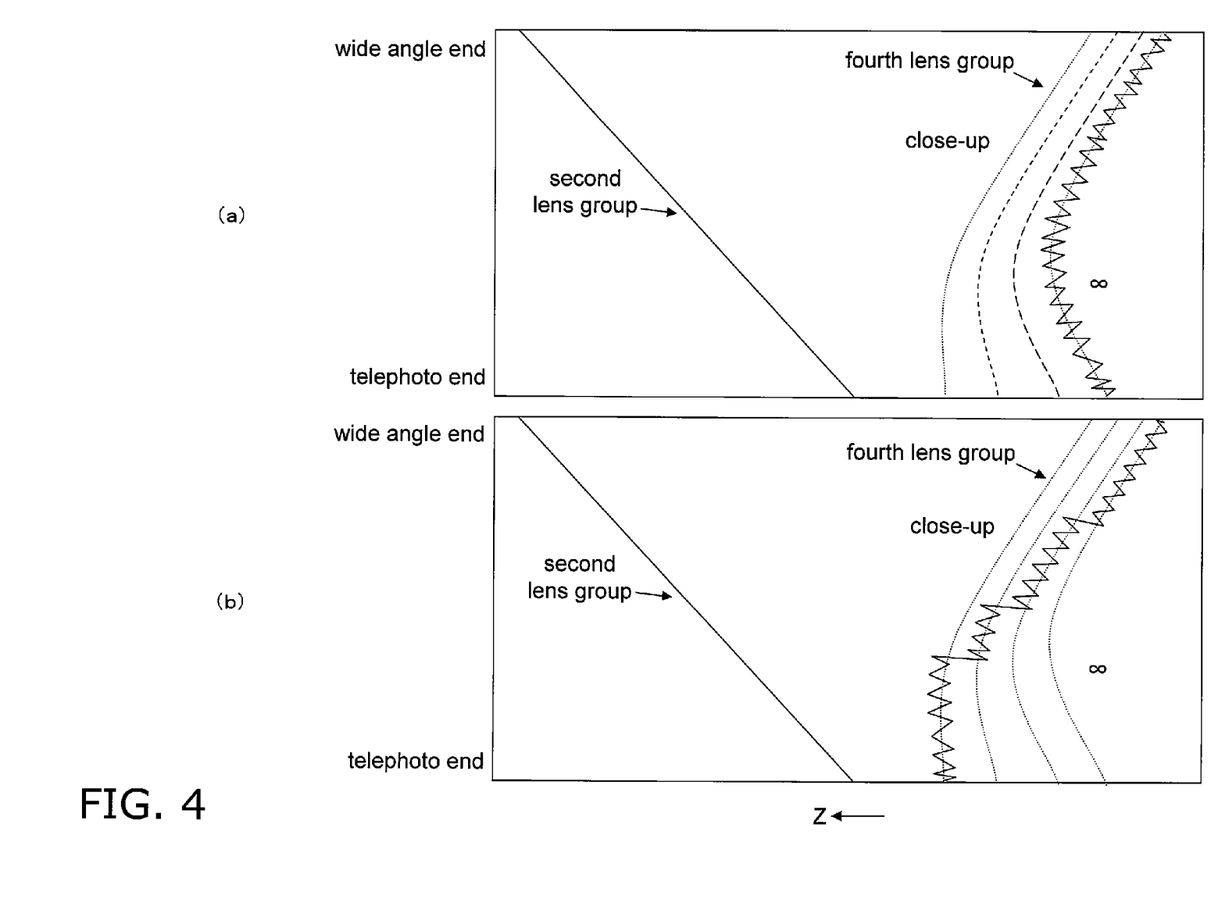
FIG. 4 consists of diagrams showing the position of the lens groups in zooming and focusing operation during moving picture imaging with a conventional lens barrel.

FIG. 4 consists of diagrams showing the position of the lens groups in zooming and focusing operation during moving picture imaging with a conventional lens barrel. Here, the second lens group in FIG. 4 is a zoom lens group, and the fourth lens group is a focus lens group. To detect the focal position during conventional moving picture imaging, the fourth lens group (a focus lens group) is subjected to what is known as wobbling, in which it is moved back and forth within a tiny range in the Z direction (optical axis direction), and the contrast values are compared at two points during this wobbling. Focal adjustment of the imaging position is accomplished by shifting the focus lens toward the larger contrast value acquired by wobbling the imaging distance back and forth, and this is repeated until the difference in the front and rear contrast values falls under a predetermined threshold. If the difference between the contrast values is under the threshold, the wobbling is continued there.

The solid line in FIG. 4a shows the movement path of the focus lens group and the zoom lens group when the focal distance changes from the wide angle end to the telephoto end. The broken lines show examples of the path of the focal position of the focus lens group when the imaging distance is at various positions from ∞ to a close-up object position. If there is no change in the imaging distance, the fourth lens group (focus lens group) continues wobbling around the current position of the imaging distance (∞ position). If the focal distance is changed at this point by the user, as shown in FIG. 4a, the second lens group (zoom lens group) moves along a lens movement path determined by the focal distance, while the fourth lens group (focus lens group) wobbles around the lens movement path of the ∞ position determined by the focal position. The movement path of the focus lens group with respect to a change in focal distance is called the focus tracking curve, and this focus tracking curve will have a different curve for each imaging distance.

FIG. 4b shows the movement path of the zoom lens group and focus lens group when the focal distance also changes from the wide angle end to the telephoto end simultaneously with a change in the imaging distance during imaging from ∞ to close-up. In this case, since the imaging distance also changes in addition to the focal distance, if it is detected that the imaging distance has changed as a result of wobbling, the oscillation center of the wobbling is changed. Since the focus tracking curve here is also changed, the result is the lens movement path shown in FIG. 4b.

Thus, with a conventional lens barrel, since the roles of zoom lens group and focus lens group are separated, if the imaging distance changes, just the focus tracking curve of the focus lens group will change, and the movement path of the zoom lens group will not change.

With the lens barrel of the present invention, however, the focal distance and imaging distance are changed by changing the positions of the three zoom/focus lens groups 10, 12, and 13. Therefore, even if there is no change in the focal distance in auto-focusing during moving picture imaging, the three zoom/focus lens groups 10, 12, and 13 still need to be moved. Accordingly, auto-focusing cannot be performed merely by wobbling just the focus lens group as with a conventional lens barrel. However, if the three zoom/focus lens groups 10, 12, and 13 are simultaneously wobbled, there will be more noise (operating noise) generated when the lens groups operate, which may end up being recorded during moving picture imaging, and the power consumption is also higher, so the imaging time will be shorter.

In view of this, with the present invention, the wobbling performed to detect the focal position during auto-focusing in moving picture imaging is performed by the lens group with the lightest weight. Consequently, this reduces both power consumption and noise generated by moving the three zoom/focus lens groups during focal adjustment and focal distance adjustment, and also makes more accurate auto-focusing possible.

Figure 5:
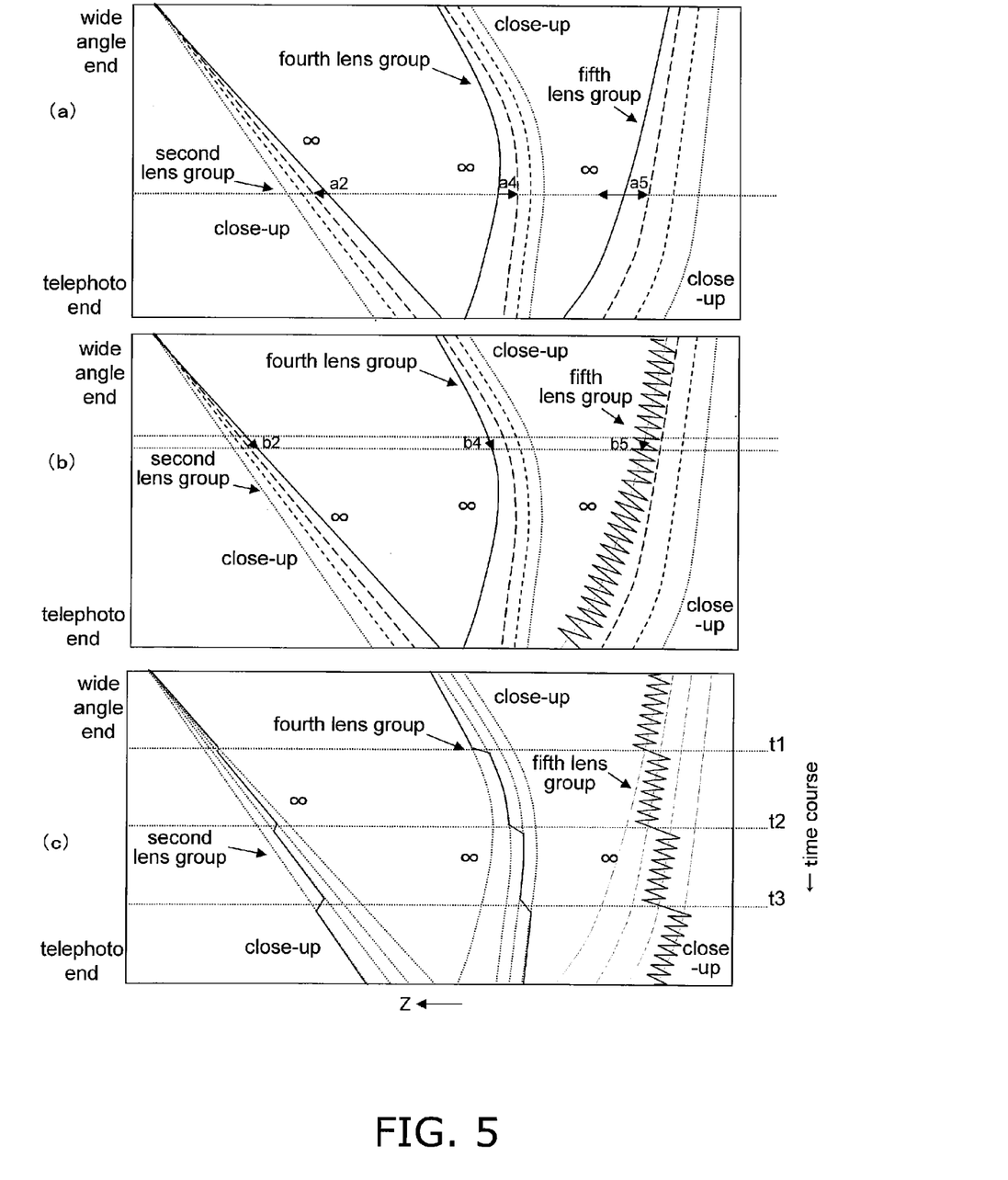
FIG. 5 consists of diagrams showing the position of the lens groups in zooming, focusing, and wobbling operation in an embodiment of the present invention.
Figure 6:
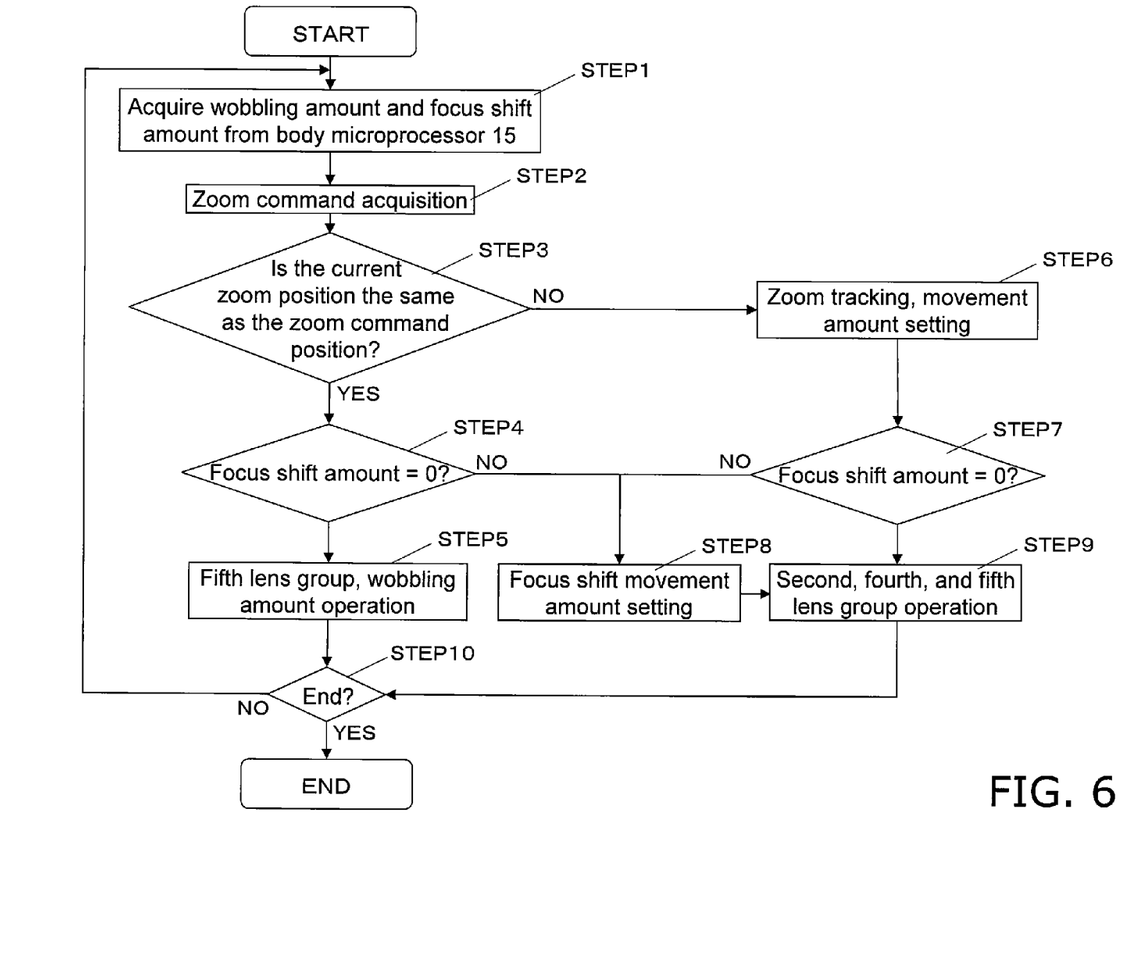
FIG. 6 is a flowchart of an example of the operation of the various lens groups during moving picture imaging.

FIG. 5 shows an example of the positions of the lens groups in zooming and focusing during moving picture imaging in an embodiment of the present invention. FIG. 6 shows a flowchart of an example of the operation of the lens groups during moving picture imaging. The curves shown in FIG. 5 are produced by combining a focus tracking curve and a zoom tracking curve. The curves shown in FIG. 5 are an example of a "zoom/focus tracking curve."

FIG. 5a shows with arrows the movement of the zoom/focus lens groups 10, 12, and 13 when the focal distance does not change during imaging and only the imaging distance (object imaging distance) changes from co to close-up.

When auto-focusing starts, the wobbling amount and focus shift amount are indicated from the body microprocessor 15 to the zoom/focus drive controller 8 in step 1 of the flowchart in FIG. 6, and the flow then moves to step 2. Here, the focus shift amount is set after the detection of the contrast value following the wobbling, so the focus shift amount is zero immediately after the start of auto-focusing.

In step 2 a zoom command position is acquired, and the flow moves to step 3. In step 3 the current zoom position recorded by the zoom/focus drive controller 8 is compared to the zoom command position acquired in step 2. In FIG. 5a, a case in which the zoom position does not change is assumed, so the flow moves on to step 4.

In step 4 it is determined whether or not the focus shift amount acquired in step 1 is zero. Since the amount is zero immediately after the start of auto-focusing, the flow moves on to step 5.

In step 5 the fifth lens group 13 is wobbled by the wobbling amount acquired in step 1. Here, the fifth lens group 13 is first driven a tiny amount in the close-up direction around the current lens position, and the flow moves on to step 10. In step 10 the flowchart ends if there is a command from the body microprocessor 15 to end auto-focusing, and otherwise the flow returns to step 1.

Upon returning to step 1, indication of the wobbling amount of focus shift amount is received from the body microprocessor 15 again, and the above flow is repeated twice. The focus shift amount remains at zero until contrast values on the infinity side and close-up side are acquired with respect to the current lens position. After this flow has been repeated a number of times, if body microprocessor 15 detects a change in the imaging distance, a value other than zero is indicated for the focus shift amount.

In this example, we will assume that a focus shift amount a moving to the close-up side has been directed. Since the focus shift amount in step 4 is not zero, the flow moves from step 4 to step 8. In step 8 the focus shift amount directed by the body microprocessor 15 is changed by the zoom/focus drive controller 8 to the focus shift amounts of the three first zoom/focus lens groups 10, 12, and 13. (We will let the focus shift amount of the second lens group 10 be a2, the focus shift amount of the fourth lens group 12 be a4, and the focus shift amount of the fifth lens group 13 be a5, for example.) When the changes are finished, the flow moves on to step 9. In step 9 the three first zoom/focus lens groups 10, 12, and 13 are simultaneously moved by their respective lens movement amounts. Here, the movement amounts of the second lens group 10 and the fourth lens group 12 are the focus shift amounts a2 and a4 set in step 8, and the movement amount of the fifth lens group 13 is the focus shift amount a5 set in step 8 and the wobbling amount set in step 1.

As a result of the movement of the lenses in step 9, the positions of the lenses in FIG. 5a move from ∞ to the close-up side as indicated by the arrows.

FIG. 5b shows the movement path of the zoom/focus lens groups when the imaging distance (object imaging distance) does not change from the 00 position during imaging, and only the focal distance changes from the wide angle end to the telephoto end.

When auto-focusing starts, the wobbling amount and focus shift amount are indicated from the body microprocessor 15 to the zoom/focus drive controller 8 in step 1 of the flowchart in FIG. 6, and the flow then moves to step 2. Here, the focus shift amount is set after the detection of the contrast value following the wobbling, so the focus shift amount is zero immediately after the start of auto-focusing.

In step 2 a zoom command position is acquired, and the flow moves to step 3. In step 3 the current zoom position recorded by the zoom/focus drive controller 8 is compared to the zoom command position acquired in step 2. In FIG. 5b, a case in which the zoom position changes is assumed, so the flow moves on to step 6.

In step 6, the three zoom/focus lens groups 10, 12, and 13 are moved according to the zoom command position, so the zoom tracking movement amounts thereof are set by the zoom/focus drive controller 8, and the flow moves on to step 7. (We will let the zoom tracking movement amount of the second lens group 10 be b2, the zoom tracking movement amount of the fourth lens group 12 be b4, and the zoom tracking movement amount of the fifth lens group 13 be b5, for example.)

In step 7 it is determined whether or not the focus shift amount acquired in step 1 is zero. Since it is assumed here that the imaging distance has not changed, the focus shift amount is zero, and the flow moves on to step 9.

In step 9 the three first zoom/focus lens groups 10, 12, and 13 are simultaneously moved by their respective set lens movement amounts. Here, the movement amounts of the second lens group 10 and the fourth lens group 12 are the zoom tracking movement amounts b2 and b4 set in step 6, and the movement amount of the fifth lens group 13 is the zoom tracking movement amount b5 set in step 6 and the wobbling amount set in step 1.

In step 10 the flowchart ends if there is a command from the body microprocessor 15 to end auto-focusing, and otherwise the flow returns to step 1.

The lens groups are driven on the lens movement paths shown in FIG. 5b by repeatedly going through the above-mentioned flowchart.

FIG. 5c shows the movement path of the zoom/focus lens groups when the focal distance also changes from the wide angle end to the telephoto end simultaneously with the change of the imaging distance (object imaging distance) from ∞ to close-up during imaging.

The operation shown in FIG. 5c is a combination of the FIGS. 5a and 5b. The solid line in FIG. 5c is the lens movement path when wobbling was performed while varying the focal distance from the start of auto-focusing, and the imaging distance was changed in addition to the focal distance at the timing of t1, t2, and t3 in the drawing.

Thus using the fifth lens group 13, which has the lightest lens group weight, to perform the wobbling for detecting the focal position during auto-focusing during moving picture imaging, and moving the three zoom/focus lens groups 10, 12, and 13 during focal adjustment and focal distance adjustment makes it possible to reduce noise, decrease power consumption, and perform more accurate auto-focusing.

In this embodiment, the description was of performing the wobbling with the lightest lens group, but this is not the only option, and wobbling may also be performed with another zoom/focus lens group.

Other Embodiments

Embodiments of the present invention are not limited to what was given above, and various modifications and corrections are possible without departing from the gist of the invention. Also, the above-mentioned embodiment is fundamentally just a preferred example, and is not intended to limit the present invention, its applications, or the scope of these applications.

(1) In the above embodiment, the digital camera was able to capture both still pictures and moving pictures, but may instead be able to capture only still pictures or only moving pictures.

(2) In the above embodiment, the digital camera may be, for example, a digital still camera, a digital video camera, a portable telephone equipped with a camera, or a PDA equipped with a camera.

(3) The above-mentioned digital camera 1 does not have a quick-return mirror, but a quick-return mirror may be installed as in a conventional single lens reflex camera.

(4) The configuration of the optical system 4 is not limited to that given in the above embodiment. For example, the third lens group 11 may consist of a plurality of lenses, and there may be a sixth lens group. Also, the configuration may include three or more lens groups during at least zooming and focusing.

(5) In the above embodiment, the exposure time of the imaging sensor 19 was controlled by actuating the shutter unit 19a, but the exposure time of the imaging sensor 19 may instead be controlled by an electronic shutter.

(6) The second lens group zoom/focus motor 25, the fourth lens group zoom/focus motor 26, and the fifth lens group zoom/focus motor 27 may be some other actuator besides a stepping motor. For example, this actuator may be an electromagnetic motor, a voice coil motor, a vibrating actuator that makes use of a piezoelectric element, or the like.

(7) The zoom/focus drive controller 8 may control the second lens group zoom/focus motor 25 so as to drive just the second lens group 10 back and forth in the optical axis 5 direction during wobbling. Also, the zoom/focus drive controller 8 may control the fourth lens group zoom/focus motor 26 so as to drive just the fourth lens group 12 back and forth in the optical axis 5 direction during wobbling. Preferably, the zoom/focus drive controller 8 controls the fifth lens group zoom/focus motor 27 so as to drive just the fifth lens group 13 (the lightest lens group) back and forth in the optical axis 5 direction during wobbling.

(8) The aperture drive motor may be another actuator besides a stepping motor. For example, this actuator may be an electromagnetic motor, a voice coil motor, a vibrating actuator that makes use of a piezoelectric element, or the like.

(9) An integrated lens type of camera was described, but the same effect can be obtained with an interchangeable lens camera.

(10) In the above embodiment, the home point detector was described as being a photointerrupter, but may instead be some other position sensor. More specifically, it may be a position sensor that makes use of an optical, electromagnetic, physical, or magnetic effect.

(11) In the above embodiment, the optical system 4 comprised three zoom/focus lens groups, namely, the second lens group 10, the fourth lens group 12, and the fifth lens group 13, but this is not the only option. The optical system 4 may comprise just two zoom/focus lens groups, or may comprise four or more zoom/focus lens groups.

INDUSTRIAL APPLICABILITY

The present invention is favorable for the lens barrel of an imaging pickup device or the like.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel and the imaging device equipped with the lens barrel. Accordingly, these terms, as utilized to describe the technology disclosed herein should be interpreted relative to the lens barrel and the imaging device equipped with the lens barrel.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. A lens barrel, comprising:
a first zoom/focus lens group and a second zoom/focus lens group configured to respectively vary a focal distance and imaging distance by moving in an optical axis direction;
a first actuator configured to drive the first zoom/focus lens group;
a second actuator configured to drive the second zoom/focus lens group; and
a drive controller configured to independently control the first actuator and the second actuator, and
the drive controller configured to wobble the first zoom/focus lens group by reciprocating only the first zoom/focus lens group out of the first and second zoom/focus lens groups in a optical axis direction, wherein
each of the first zoom/focus lens group and the second zoom/focus lens group zooms and focuses by changing its position in the optical axis direction.

2. The lens barrel according to claim 1, wherein
the drive controller has a plurality of zoom/focus tracking curves preset for each of the first and second zoom/focus lens groups, and
the drive controller moves the first and second zoom/focus lens groups along the plurality of zoom/focus tracking curves while wobbling the first zoom/focus lens group around a path of a zoom tracking curve out of the plurality of zoom/focus tracking curves, and moves the first zoom/focus lens group and the second zoom/focus lens group based on the plurality of zoom/focus tracking curves during focal distance adjustment.

3. An imaging pickup device capable of outputting an optical image of an object as an electrical image signal, comprising:
the lens barrel according to claim 1; and
an imaging element configured to convert an optical image formed by the lens barrel into an electrical image signal.

4. A camera configured to convert an optical image formed by the lens barrel into an electrical image signal, and display and/or storage of the converted image signal, the camera comprising:
an imaging pickup device including the lens barrel according to claim 1 and an imaging element, the imaging element configured to convert an optical image formed by the lens barrel into an electrical image signal.

5. The lens barrel according to claim 1, wherein
the first zoom/focus lens group which is wobbled is lighter than the second zoom/focus lens group.

* * * * *